(12) United States Patent
Choi et al.

(10) Patent No.: US 9,524,699 B2
(45) Date of Patent: Dec. 20, 2016

(54) WEARABLE ELECTRONIC DEVICE AND PERIPHERAL DEVICE CONTROL METHOD FOR USING THE SAME

(71) Applicant: Samsung Electronics Co., Ltd., Gyeonggi-do (KR)

(72) Inventors: Jongchul Choi, Gyeonggi-do (KR); Byounguk Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/523,187

(22) Filed: Oct. 24, 2014

(65) Prior Publication Data

US 2015/0116217 A1 Apr. 30, 2015

(30) Foreign Application Priority Data

Oct. 24, 2013 (KR) ........................ 10-2013-0127235

(51) Int. Cl.

| G09G 5/00 | (2006.01) |
|---|---|
| G09G 5/12 | (2006.01) |
| G06F 3/14 | (2006.01) |
| G06F 1/16 | (2006.01) |
| G06F 3/0354 | (2013.01) |
| G06F 3/0482 | (2013.01) |
| G06F 3/0487 | (2013.01) |
| G06F 3/03 | (2006.01) |
| G06F 3/0362 | (2013.01) |

(52) U.S. Cl.
CPC ................ *G09G 5/12* (2013.01); *G06F 1/163* (2013.01); *G06F 1/1632* (2013.01); *G06F 3/0304* (2013.01); *G06F 3/0362* (2013.01); *G06F 3/03547* (2013.01); *G06F 3/0482* (2013.01); *G06F 3/0487* (2013.01); *G06F 3/1423* (2013.01); *G09G 2330/02* (2013.01); *G09G 2354/00* (2013.01); *G09G 2370/16* (2013.01)

(58) Field of Classification Search
CPC .... G06F 1/163; G06F 1/1632; G06F 3/03547; G06F 3/0482; G06F 3/0488; G06F 3/1423; G06F 3/04815; G06F 3/017; G06F 3/0346; G06F 7/10891; G06F 3/014; G09G 5/12; G09G 2330/02; G09G 2354/00; G09G 2370/16; H04N 21/41407; H04N 1/00307
USPC ............... 345/156–184, 96, 209; 341/20–35; 381/110; 704/231; 178/18.01–20.04; 715/769, 786, 833–834, 843
See application file for complete search history.

(56) References Cited

U.S. PATENT DOCUMENTS

| 8,972,722 B2* | 3/2015 | Faaborg | G06F 21/00 |
|---|---|---|---|
| | | | 340/568.1 |
| 2003/0227746 A1* | 12/2003 | Sato | G06F 1/1632 |
| | | | 361/679.57 |
| 2011/0170256 A1* | 7/2011 | Lee | G04G 17/086 |
| | | | 361/679.44 |
| 2011/0210931 A1* | 9/2011 | Shai | G06F 3/014 |
| | | | 345/173 |

FOREIGN PATENT DOCUMENTS

WO    WO 2010/036780    4/2010

\* cited by examiner

*Primary Examiner* — Nelson Rosario
(74) *Attorney, Agent, or Firm* — The Farrell Law Firm, P.C.

(57) ABSTRACT

A peripheral device control system is provided and includes a wearable electronic device configured to generate a control command based on a bezel rotation of a display portion and a peripheral device operable to perform at least one function (Continued)

that is controlled in response to the control command generated by the wearable electronic device.

11 Claims, 13 Drawing Sheets

WEARABLE ELECTRONIC DEVICE AND PERIPHERAL DEVICE CONTROL METHOD FOR USING THE SAME

PRIORITY

This application claims priority under 35 U.S.C. §119(a) to Korean Patent Application Serial No. 10-2013-0127235, which was filed in the Korean Intellectual Property Office on Oct. 24, 2013, the entire disclosure of which is incorporated herein by reference.

BACKGROUND OF THE INVENTION

1. Field of the Invention

The present invention relates generally to a wearable electronic device and a method and a system for controlling a peripheral device using the same, and more particularly, to a wearable electronic control device configured to control one or more functions of the peripheral device.

2. Description of the Related Art

Recently, wearable electronic devices have become popular based on an increase of an interest of users in real-time data and a development of a near field communication technology. The wearable electronic device may be embodied as a device, which is worn on a part of a user's body, for example, a wrist wearing type, a glasses type, or the like. The wearable electronic device can, in real-time, identify data which a user wants without having to pull out a portable electronic device (non-wearable) from a pocket or a bag.

In addition, it is advantageous to reduce the weight and the size the wearable electronic device, in comparison with the conventional non-wearable electronic device, in order to achieve the advantage of body-wearing thereof.

Since the wearable electronic device is typically small as compared to non-wearable electronic devices, the wearable electronic devices typically exhibit rapid battery depletion, a small sized screen, etc. Therefore, the wearable electronic device frequently requires to be interlocked with a peripheral device for more frequent battery charging, effective use of a speaker and a display, and the like.

Therefore, there exists a need for an electronic device which is lightweight, has long battery life, and ample screen size.

SUMMARY OF THE INVENTION

The present invention has been made to address at least the problems and/or disadvantages described above and to provide at least the advantages described below.

An aspect of the present invention provides that when the wearable electronic device has been cradled in a peripheral device, the wearable electronic device and a peripheral device control method and system using the wearable electronic device enables the wearable electronic device to control the peripheral device.

Another aspect of the present invention provides a wearable electronic device and a peripheral device control method and system using the wearable electronic device that can provide a wireless charging function of the wearable electronic device mounted in the peripheral device.

In accordance with an aspect of the present invention, there is provided a peripheral device control system that includes a wearable electronic device configured to generate a control command based on a bezel rotation of a display portion and a peripheral device operable to perform at least one function that is controlled in response to the control command generated by the wearable electronic device.

In accordance with another aspect of the present invention, there is provided a peripheral device control method. The peripheral device control method includes detecting that a wearable electronic device is mounted in a docking device; identifying a connection with the docking device by the wearable electronic device; determining whether a control function selection mode is executed when the connection is identified; detecting a control function menu selection and controlling a peripheral device with the selected method when the control function selection mode has been executed; and controlling a peripheral device with a previously configured method when the control function selection mode has not been executed.

BRIEF DESCRIPTION OF THE DRAWINGS

The above and other aspects, features and advantages of the present invention will be more apparent from the following detailed description in conjunction with the accompanying drawings, in which:

FIGS. 3A-3D are diagrams illustrating rotation operations of a wearable electronic device and a docking device according to an embodiment of the present invention;

FIGS. 5A-5D are diagrams illustrating a method by which a wearable electronic device controls a peripheral device in a control function selection mode according to an embodiment of the present invention.

DETAILED DESCRIPTION OF EMBODIMENTS OF THE PRESENT INVENTION

Hereinafter, embodiments of the present invention will be described with reference to the accompanying drawings. It should be noted that the same elements will be designated by the same reference numerals although they are shown in different drawings. Further, detailed descriptions related to well-known functions or configurations capable of the making subject matter of the present invention unnecessarily obscure will be omitted.

Meanwhile, embodiments of the present invention shown and described in this specification and the drawings correspond to specific examples presented in order to easily explain technical contents of the present invention, and to help comprehension of the present invention, but are not intended to limit the scope of the present invention. It will be apparent to those having ordinary skill in the art, to which the present invention pertains, that it is possible to practice other modified embodiments based on the technical idea of the present invention as well as the embodiments disclosed herein.

In accordance with the embodiments described herein, when the wearable electronic device has been cradled in a peripheral device, the wearable electronic device and a peripheral device control method and system using the wearable electronic device allow the wearable electronic device to control the peripheral device and enables the wearable electronic device to be wirelessly charged through the peripheral device.

Figure 1A:
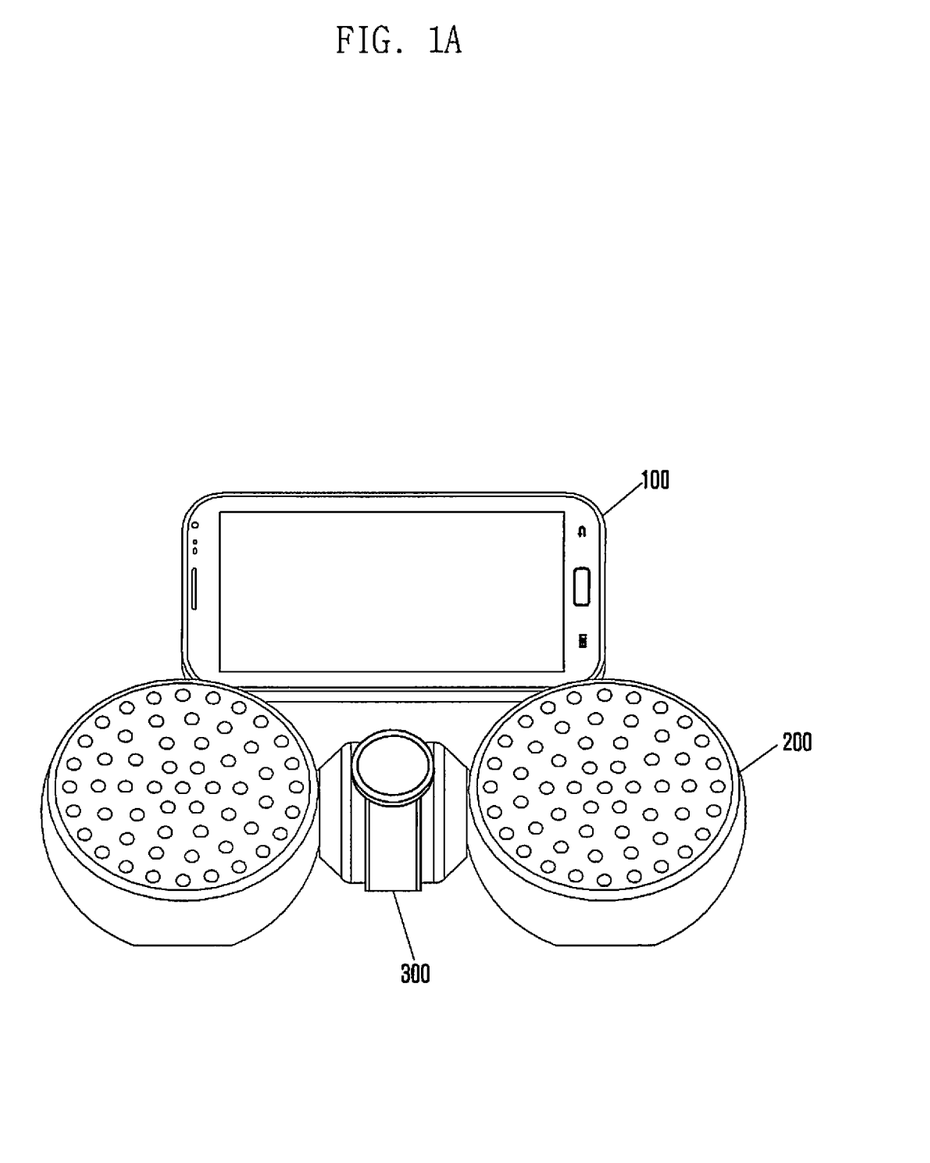
FIGS. 1A and 1B are diagrams illustrating a configuration of a system of supporting a peripheral device control function of a wearable electronic device according to an embodiment of the present invention.
Figure 1B:
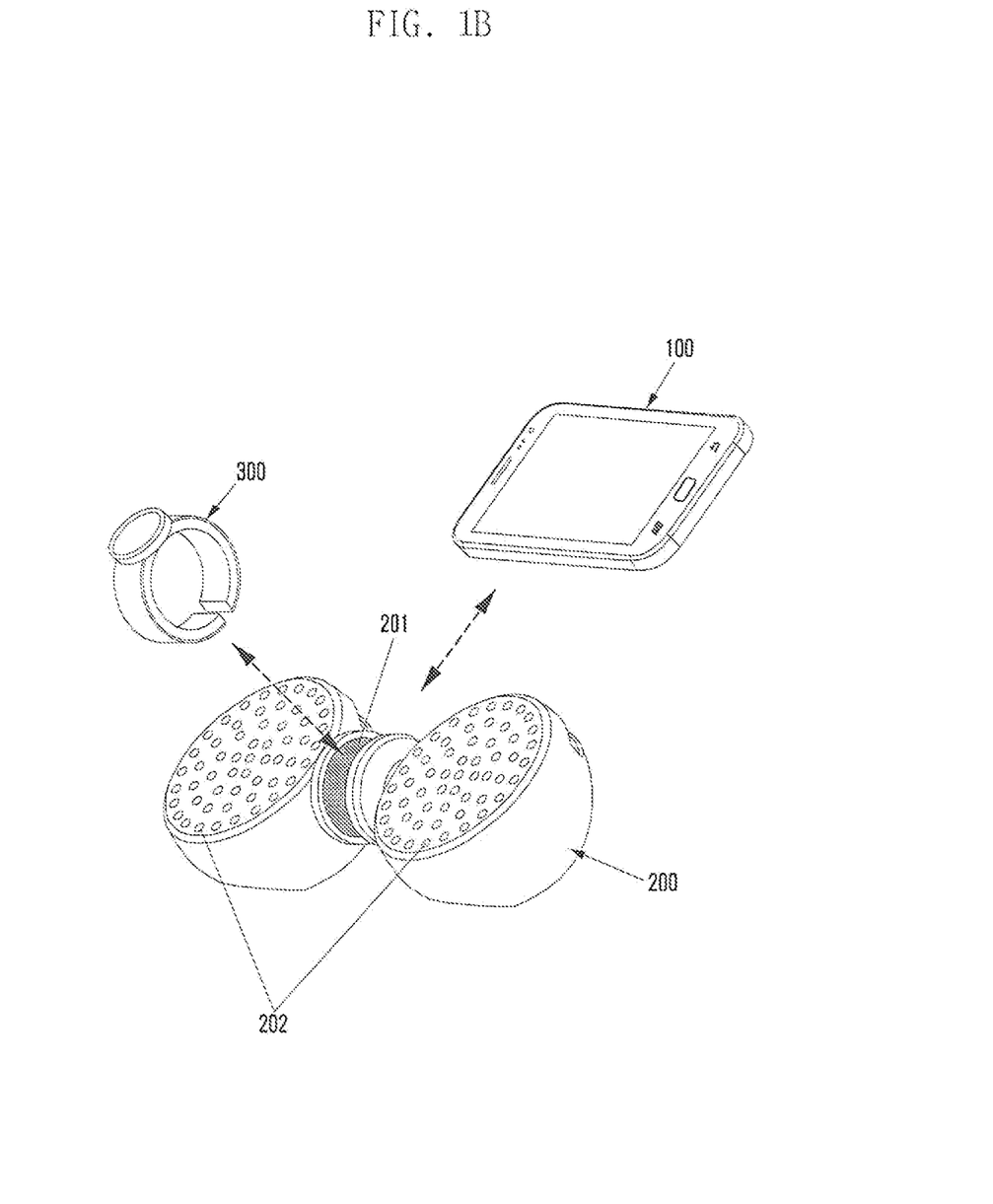

FIGS. 1A and 1B are diagrams illustrating a configuration of a system of supporting a peripheral device control function of a wearable electronic device according to an embodiment of the present invention.

Referring to FIG. 1A, a system supporting a function according to an embodiment of the present invention includes a display device 100, a docking device 200, and a wearable electronic device 300.

Various devices including a display may be used for the display device 100. For example, a monitor, a tablet, a mobile phone, a game console, or the like may correspond to the display device 100.

The docking device 200 may be interlocked with the wearable electronic device 300 and receives a command executed in the wearable electronic device 300 so as to perform the command. In addition, the docking device 200 transmits a command generated in the wearable electronic device 300 to another interlocked peripheral device (e.g., a display device). However, a path for performing a function according to the embodiment of the present invention is not limited thereto and the wearable electronic device 300 may transmit a direct command by being wirelessly connected to another peripheral device (e.g., display device). Further, an external shape of the docking device 200 may be configured to cause a main device for a control (e.g., a wearable electronic device) and another peripheral device (e.g., a display device) to be cradled. In addition the docking device 200 may perform a role of a peripheral device (e.g., a speaker). The docking device 200 may be configured to include a loading portion 201 where the wearable electronic device 300 is loaded. In this instance, the loading portion 201 is provided on a cover of a main body where a wireless connection device and a wireless charging antenna of the docking device 200 is provided. Therefore, the docking device 200 is wirelessly connected in a position close to a device loaded in the loading portion 201 so that a smooth docking operation can be performed. In addition, the docking device 200 may be formed by including the speakers 202 on either side of the main body.

The external shape of the wearable electronic device 300 may be formed similar to a watch. The wearable electronic device 300 may be cradled on a cradle formed in the docking device 200.

Referring to FIG. 1B, the wearable electronic device 300 may wirelessly connect to the docking device 200 using a near field communication technology, together with the display device 100. For example, the docking device 200 may be connected to the wearable electronic device 300 and the display device 100 using technologies such as Bluetooth®, Near Field Communication, or the like. The docking device 200 receives a command generated in a main device and performs a function for the command through the wireless connection as described above. In addition, the docking device 200 enables wireless charging to be performed using an antenna (not shown) installed on the inside of the docking device 200 when the wearable electronic device 300 has been cradled to the docking device 200.

Figure 2:
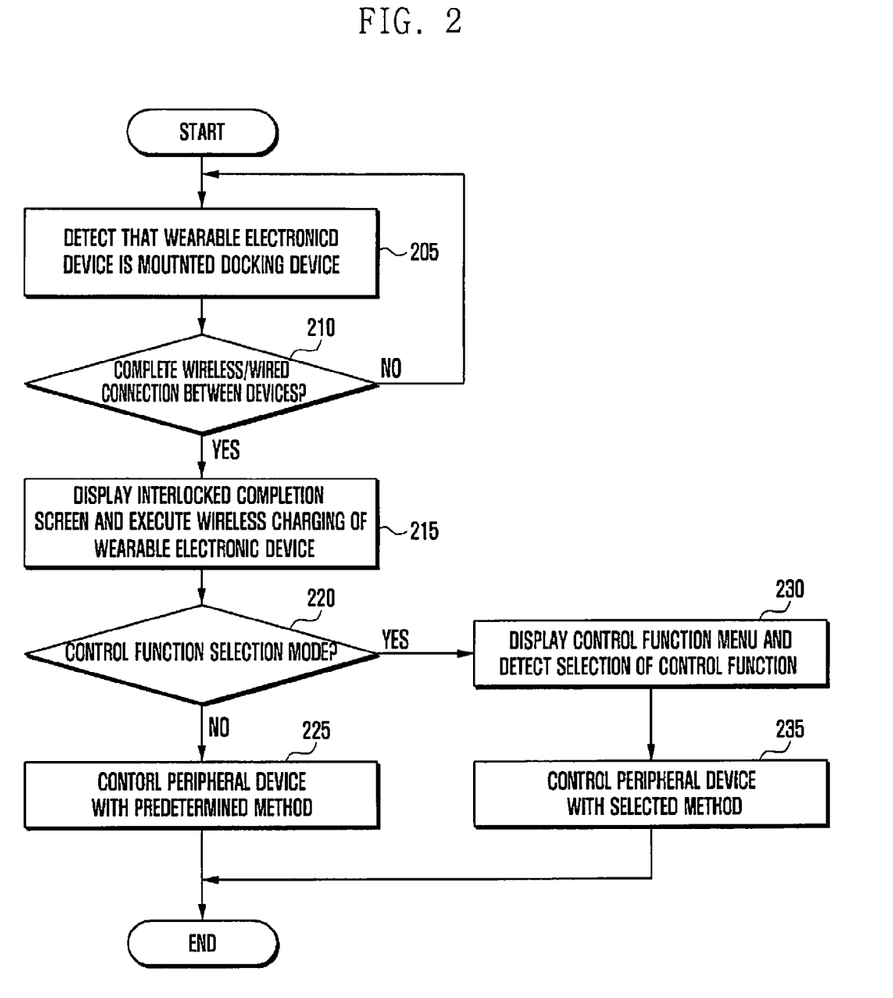
FIG. 2 is a flow chart illustrating a method of controlling a peripheral device using a wearable electronic device according to an embodiment of the present invention.

FIG. 2 is a flow chart illustrating a method of controlling a peripheral device using a wearable electronic device according to an embodiment of the present invention.

Firstly, at step 205 of FIG. 2, it may be detected that the wearable electronic device 300 is mounted in the docking device 200. The wearable electronic device 300 may be mounted on the loading portion 201 formed in the docking device 200. The loading portion 201 is a configuration of being included on the main body where a near field communication device is positioned to cause the wearable electronic device 300 to be wirelessly connected more smoothly to the docking device 200. When the wearable electronic device 300 has been loaded on the loading portion 201 of the docking device 200, the wearable electronic device 300 identifies whether a wireless connection or a wired connection is present between devices, at step 210. When a wireless/wired connection between the wearable electronic device 300 and the docking device 200 has not been completed, the docking device 200 may re-perform the operation of the device-mounting. Meanwhile, when the wireless connection between the devices has been identified, step 215 is performed.

At step 215, a screen, which is completely interlocked with one or more screens of a screen of the wearable electronic device 300 and a screen of the display device 100, is displayed. Further, at step 215, the wearable electronic device 300 performs wireless charging through the docking device 200.

After step 215, the wearable electronic device 300 identifies whether the wearable electronic device 300 is in a control function selection mode, at step 220. The control function selection mode may be performed, for example, when a button formed on a side of the wearable electronic device 300 has been pressed. In addition, in the control function selection mode, all peripheral device control methods, which the wearable electronic device 300 can perform, may be displayed. For example, the peripheral device control methods which the wearable electronic device 300 can perform may include a zoom function, a page movement function, and the like.

When the control function selection mode has not been executed, the wearable electronic device 300 controls the peripheral device with a predetermined method, at step 225. When a specific program (e.g., a music playback program, a video playback program) has been performed, the wearable electronic device 300 configures a used peripheral device control method. A case in which the peripheral device is controlled with the predetermined method will be described in reference to drawings below.

On the other hand, when the control function selection mode has been performed, the wearable electronic device 300 displays a control function menu and detects a selection of a control function, at step 230. The control function menu may be displayed, for example, on the screen of the wearable electronic device 300. Then, the wearable electronic device 300 controls the peripheral device with a selected method, at step 235. The method of controlling the peripheral device in the control function selection mode as described above will be described in reference to drawings below.

Hereinafter, a method by which the wearable electronic device 300 controls a peripheral device will be described in reference to FIGS. 3A-5D.

FIGS. 3A-3D are diagrams illustrating rotation steps of a wearable electronic device and a docking device according to an embodiment of the present invention.

Figure 3A:
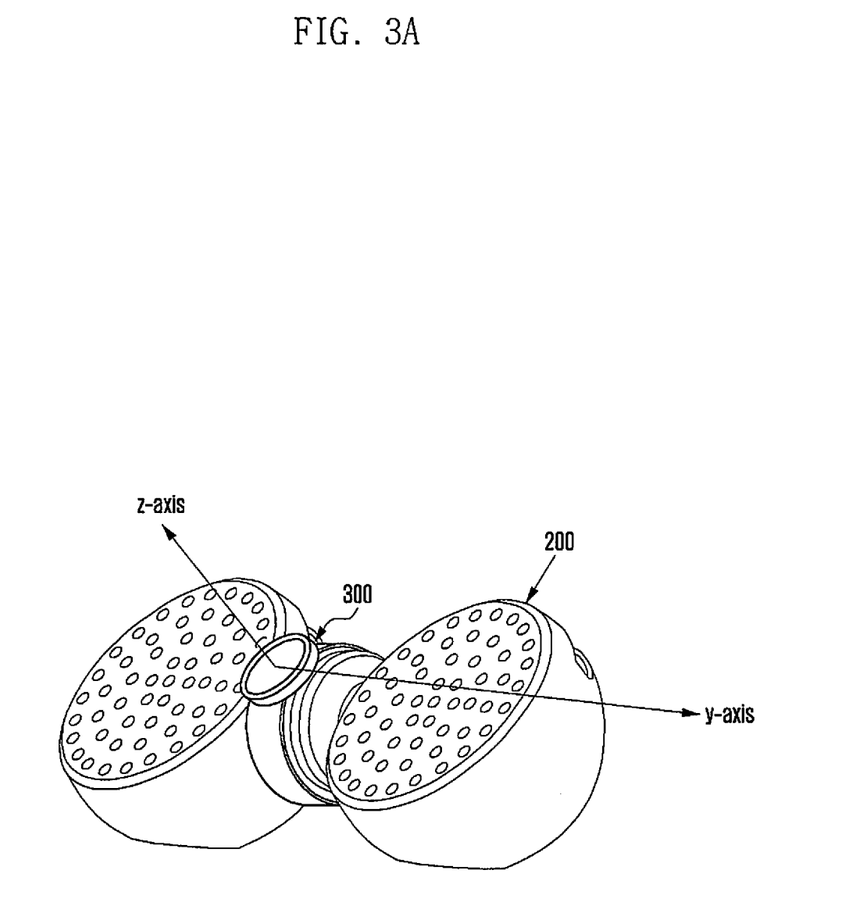

Referring to FIG. 3A, an operation of a device will be described. Firstly, FIG. 3A illustrates a y axis of a shape of stretching according to speakers which are horizontal to a display unit 305 of the wearable electronic device 300 and are included on both sides of the docking device 200. Viewing the loading portion 201 from the side, the y axis may be an axis extending through the center of the loading portion 201 and may be thus referred to as a central axis.

Further, FIG. 3A illustrates an axis which is perpendicular to the display unit 305 of the wearable electronic device 300, and is illustrated as the z axis.

Figure 3B:
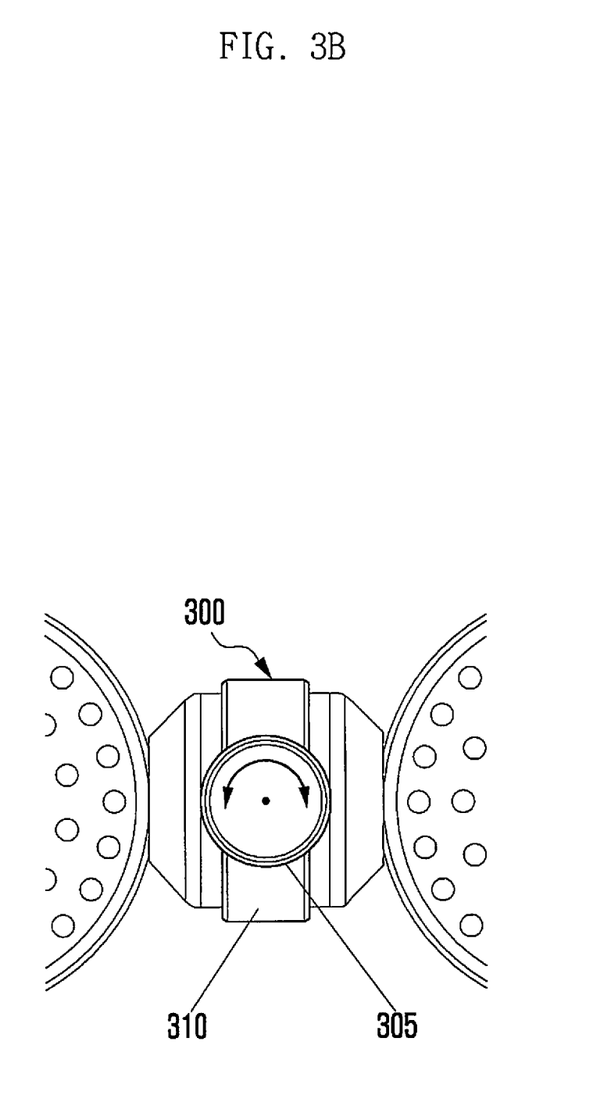

FIG. 3B illustrates that the wearable electronic device 300 is formed with the display unit 305 and a band 310. In addition, FIG. 3B illustrates that the wearable electronic device 300 can include a bezel surrounding a perimeter of the display unit 305, and the bezel can rotate clockwise and counter-clockwise in relation to the docking device 200 when the electronic device is cradled in the docking device 200.

Figure 3C:
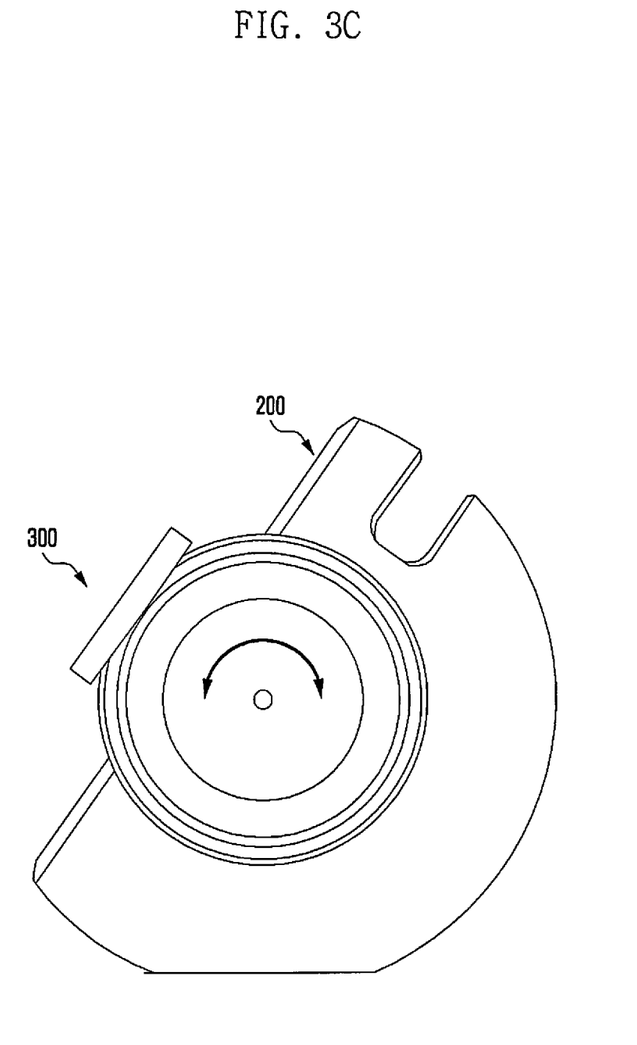

FIG. 3C illustrates that the wearable electronic device 300 may be loaded in the docking device 200 so that the docking device 200 may be rotated clockwise and counter-clockwise around the y axis. In this event, rotation of the docking device 200 may be detected by using a variation of a resistance value of a variable resistance in the docking device 200 according to the rotation. In addition, since the wearable electronic device 300 may also be rotated together when the docking device has been rotated, a rotation may be detected using an acceleration sensor or a gyro sensor mounted in the wearable electronic device 300.

Figure 3D:
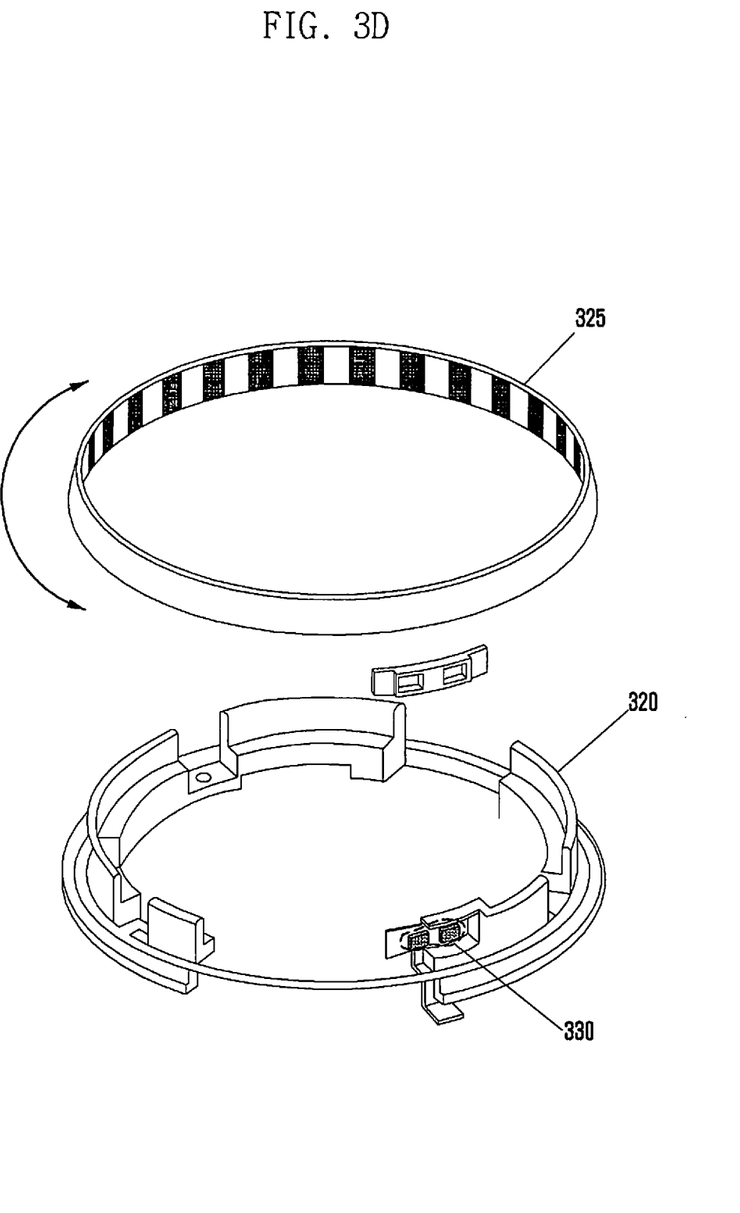

FIG. 3D illustrates an example of a method of recognizing that a bezel is rotated in the wearable electronic device 300. Further, FIG. 3D is an exploded perspective view of parts of the display unit of the wearable electronic device 300. Referring to FIG. 3D, the wearable electronic device 300 may include a bezel rotating part 325 where a pattern is formed to recognize a rotation of the bezel and a bezel housing 320 supporting an external shape of the bezel rotating part 325. The pattern may be formed to be divided into, for example, an area where a reflection factor of a light is relatively high and an area where a reflection factor of a light is relatively low.

Further, a photo sensor 330 may be included in the bezel housing 320. The photo sensor 330 includes a light emitting part and a light receiving part, and project a light at one point within the bezel rotating part 325 in the light emitting part. The light projected at one point of the bezel rotating part 325 may be again reflected and then be collected to the light receiving part of the photo sensor 330. In addition, the photo sensor 330 analyzes a signal corresponding to the light collected to the light receiving part. In this event, the collected light may have a value corresponding to a point at which the light has been reflected from, among the patterns in the bezel rotating part 325. For example, when a light emitted in the light emitting part has been reflected at a point which has a higher reflection factor, a signal corresponding to the light may have a large value. On the other hand, when a light has been reflected at a point which has a low reflection factor, a signal of a light incident to the light receiving part may have a low value.

The photo sensor 330 detects the number of times by which a signal value of the collected light changes and identifies a degree of a rotation and a direction of rotation of the bezel rotating part 325. However, the method of detecting the rotation of the wearable electronic device 300 is not limited thereto and various methods can be applied to.

Figure 4A:
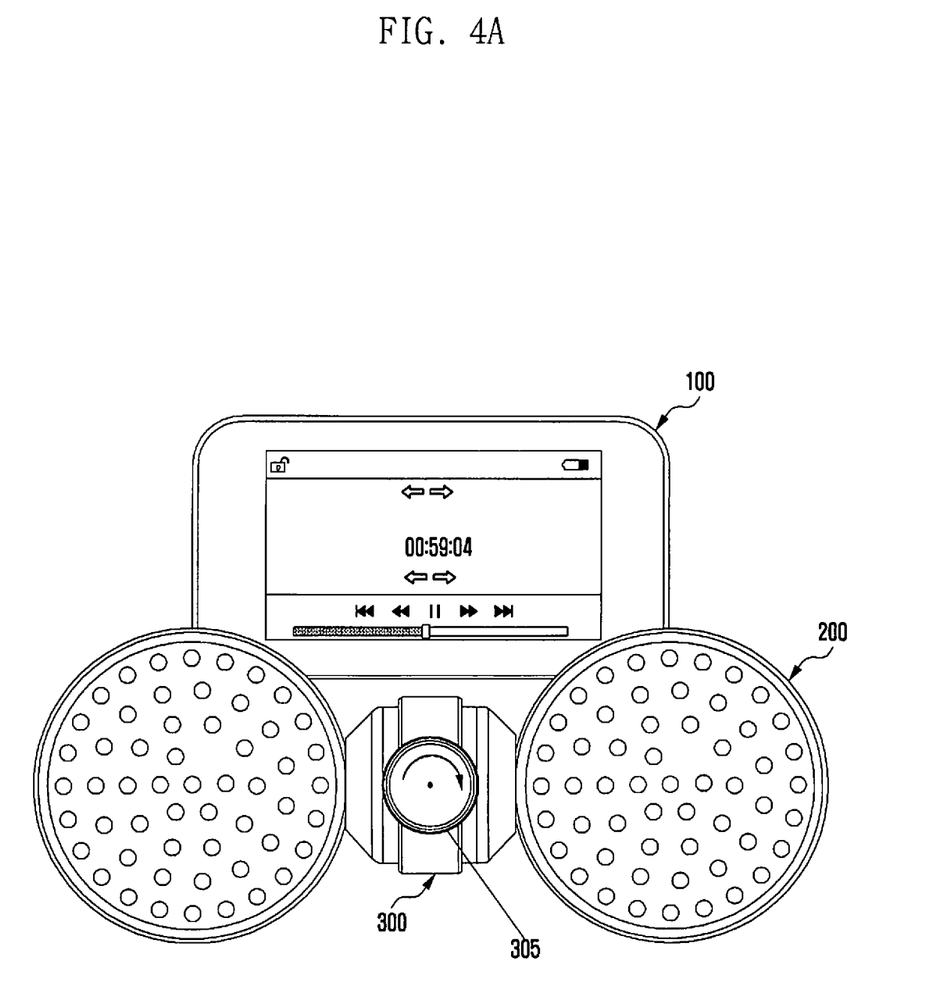
FIGS. 4A and 4B are diagrams illustrating a method by which a wearable electronic device controls a peripheral device with a predetermined method according to an embodiment of the present invention.
Figure 4B:
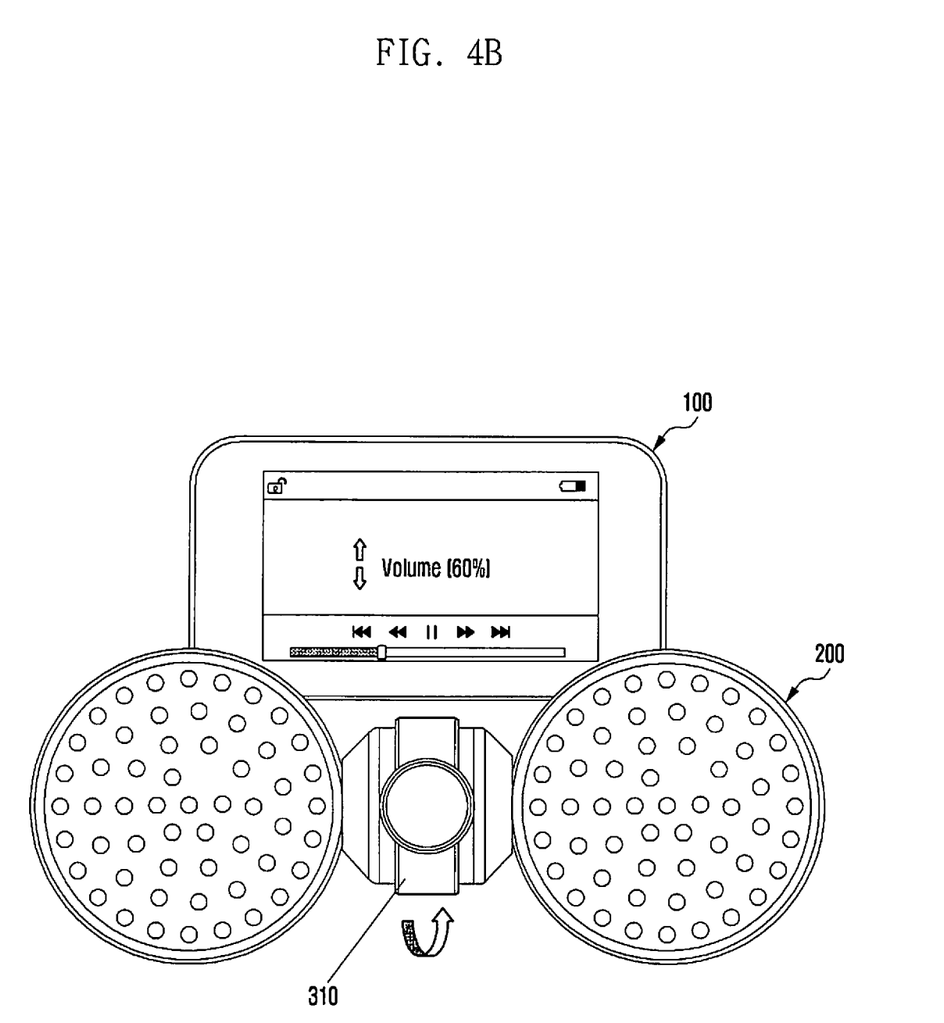

Referring to FIGS. 4A and 4B, a method of controlling a peripheral device will be described with the predetermined method. FIGS. 4A and 4B illustrate a method by which a wearable electronic device 300 controls a peripheral device with a predetermined method according to an embodiment of the present invention.

Firstly, FIG. 4A illustrates that a specific program controlled with the predetermined control method in the wearable electronic device 300 is being performed. The program performed in FIG. 4A may be, for example, a music playback program. When a control function selection mode has not been executed, the wearable electronic device 300 performs a music playback program, a video playback program, or a radio playback program without displaying a separate selection menu. In this event, the wearable electronic device 300 has a control method mapped in the program. Further, when the wearable electronic device 300 performs a rotation about the y axis and the z axis, the predetermined control method is operated. For example, as shown in FIG. 4A, when the display unit 305 of the wearable electronic device 300 has been rotated clockwise while the music playback function is performed, a fast-forward function may also be performed. On the contrary, when the display unit 305 has been rotated counter-clockwise, the music playback function may perform rewinding. However, a control method mapped in each function is not limited thereto and a function according to a rotation of the display unit 305 may be configured as a screen brightness adjustment function, a playback mode change function, a playback file change function, or the like.

Further, FIG. 4B illustrates that a control function mapped in the operation is performed when a holding part 310 of a wearable electronic device is rotated (the wearable electronic device is rotated about the y axis direction). As illustrated in FIG. 4B, when the holding part 310 of the wearable electronic device 300 has been rotated while the music playback function is performed, a volume control function which is the control function mapped in the operation may be performed. For example, the wearable electronic device 300 controls a peripheral device to make a volume decrease when the holding part 310 is rotated downward and make a volume increase when the holding part 310 is rotated upward. In addition, a volume changed by the control method may be identified through a speaker attached to the docking device 200.

Referring to FIGS. 5A-5D, a method of controlling a peripheral device in a case in which the wearable electronic device 300 is in a control function selection mode will be described.

FIGS. 5A-5D illustrate a method by which a wearable electronic device controls a peripheral device in a control function selection mode according to an embodiment of the present invention.

Figure 5A:
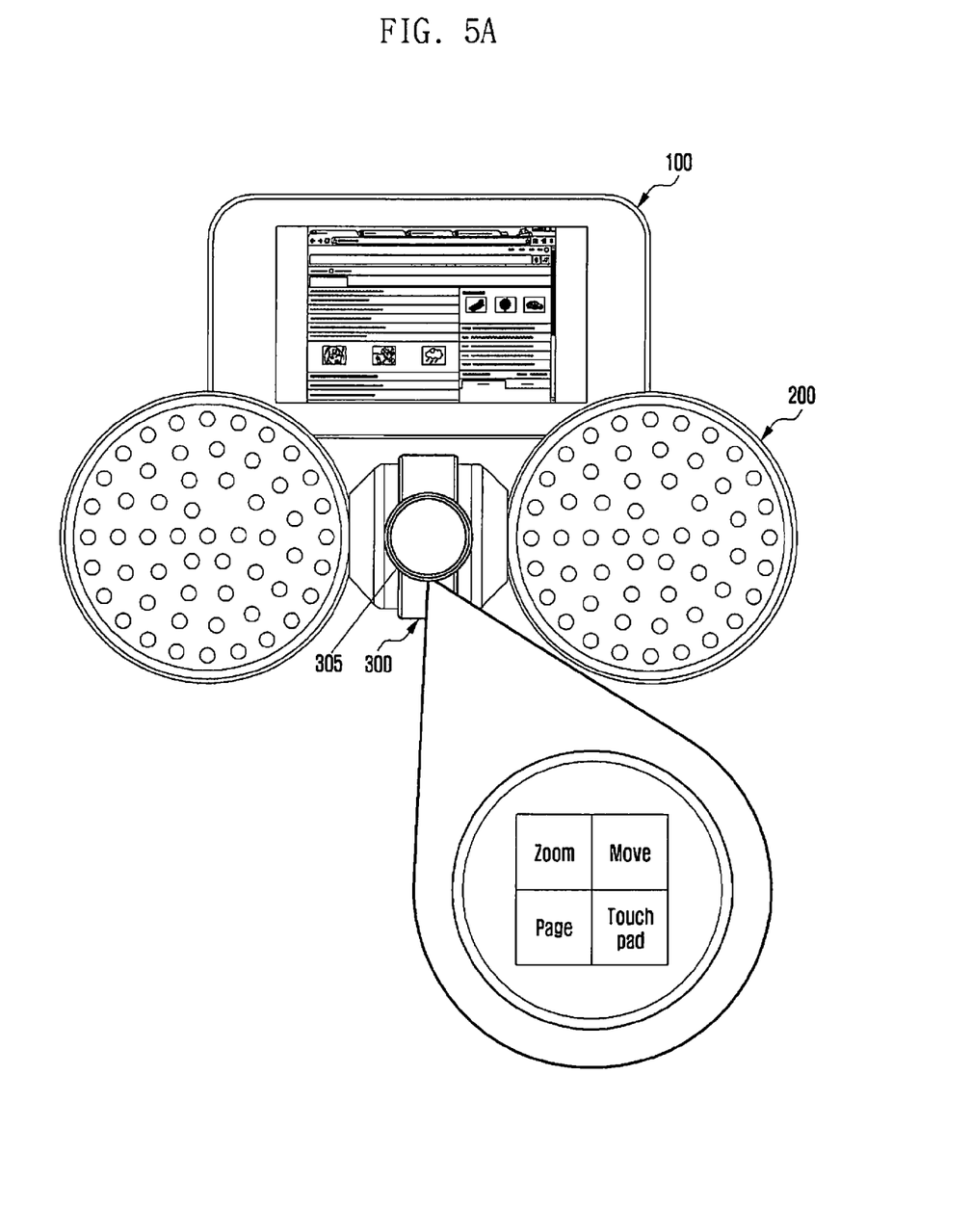

FIG. 5A illustrates a menu displayed in the display unit 305 when the wearable electronic device 300 is in the control function selection mode. Even though not shown in the drawings, a button which enables the control function selection mode to be directly performed may be included on a side of the wearable electronic device 300. In the display unit 305, a list of a peripheral device control method which the wearable electronic device 300 can provide may be displayed. When the wearable electronic device 300 executes the control function selection mode, the display unit 305 displays a zoom function, a movement function, a page control function, and a touch pad function as shown in FIG. 5A. A user may select an item to be controlled among the listed functions. Further, the control function selection mode may be used when an operation (e.g., internet page execution) in which a specific control function is mapped is to be performed. For example, in such a mode the display device 100 may be used to display an internet page. In this instance, a separate function that is mapped with an operation of rotating the display unit 305 and the holding part 310 of the wearable electronic device 300 is not needed.

Figure 5B:
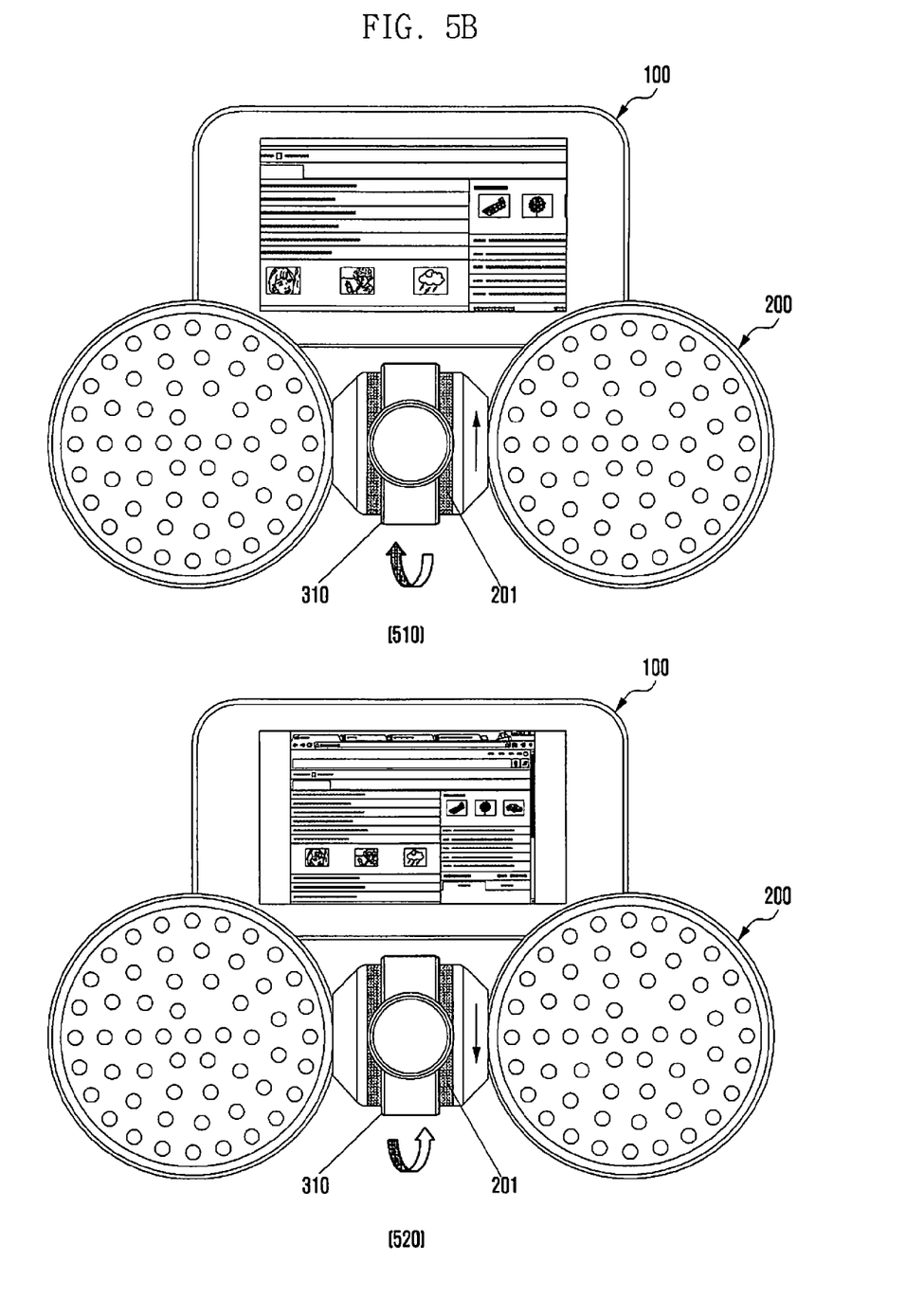

FIG. 5B illustrates a method of controlling a peripheral device when a zoom function is selected in the control function selection mode. Firstly, reference numeral 510 of FIG. 5B illustrates a zoom in function that is performed in the display device 100 with a peripheral device control method. The wearable electronic device 300 may be loaded in a loading portion 201 of a docking device 200 as indicated by reference numeral 510. Further, the wearable electronic device 300 displays a screen of the display device 100 using the docking function. For example, the wearable electronic device 300 displays an internet page in the display device 100. When a holding part 310 of the wearable electronic device 300 has been rotated upward, the loading portion 201 of the docking device 200 may also be rotated upward along with the wearable electronic device 300. When the loading portion 201 of the docking device 200 has been rotated in a direction of an arrow as illustrated in the drawing using the method as described above, the zoom in function may be performed.

Reference numeral 520 of FIG. 5B illustrates a zoom out function that is performed in the display device 100 with a peripheral device control method. When the wearable electronic device 300 has been rotated downward according to an arrow as indicated by reference numeral 520, the loading portion 201 of the docking device 200 may also be rotated downward along with the wearable electronic device 300. As the loading portion 201 is rotated downward as described above, the zoom out function may be performed. Accordingly, the display device 100 may display a reduced internet page.

Figure 5C:
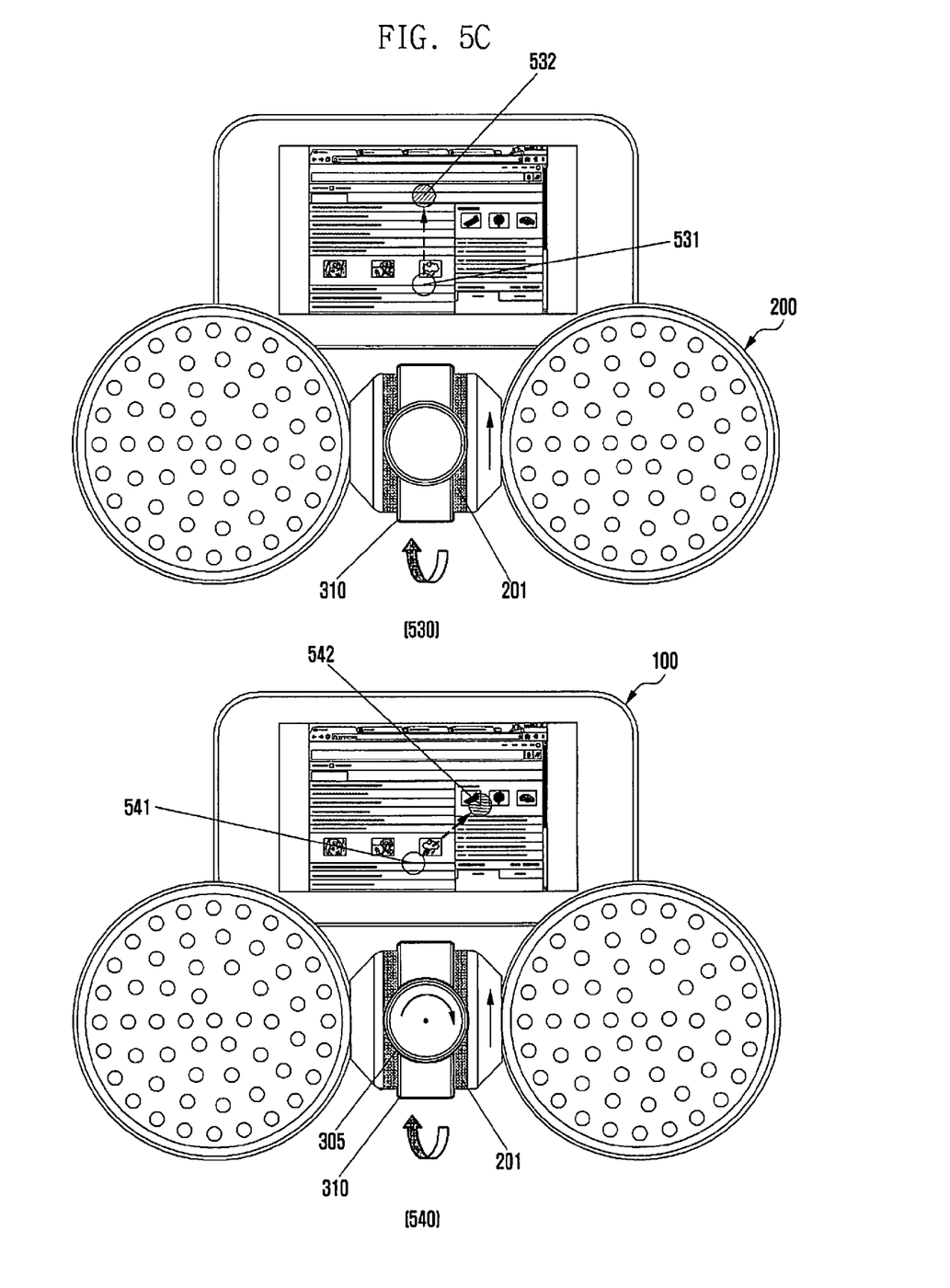

FIG. 5C illustrates a peripheral device that is controlled when a movement function has been selected in a control function selection mode.

Firstly, when the movement function has been selected in the control function selection mode, a pointer 531 may be generated and displayed on a screen of the display device 100. In addition, when the wearable electronic device 300 has been operated in a state in which the movement function has been selected, the display device 100 displays a movement of the pointer.

Referring to reference numeral 530 of FIG. 5C, when a holding part 310 of the wearable electronic device 300 has been rotated in a direction of an arrow (upward), the generated pointer 531 moves to a position 532 corresponding to a rotation of the loading portion. Since the loading portion 201 of the docking device 200, where the holding part 310 is loaded, is rotated, an actual y axis rotation operation may be performed. However, for convenience of the description, only an operation of rotating the holding part 310 of the wearable electronic device 300 will be described. Even though an upward movement of the pointer corresponding to an upward rotation of the loading portion is illustrated in reference numeral 530, a downward movement of a pointer according to a downward rotation may be performed as described above.

Reference numeral 540 of FIG. 5C illustrates a diagonal line movement method of a pointer. When a movement function has been selected in the control function selection mode, a pointer 541 may be generated at one point of a display device 100 as illustrated in reference numeral 540. Further, a rotation of a display unit 305 of the wearable electronic device 300 controls a horizontal movement of the pointer 541 and a rotation of the holding portion 310 controls a vertical movement of the pointer 541. For example, when a direction of a rotation of the display unit 305 is right, the pointer moves to the right and when the direction of the rotation is left, the pointer moves to the left. Similarly, when a direction of a rotation of the holding portion 310 is upward, the pointer moves upward and when the direction of the rotation is downward, the pointer moves downward.

Reference numeral 540 of FIG. 5C illustrates an operation in which the display unit 305 of the wearable electronic device is rotated to the right and the holding part 310 is rotated upward. In addition, the display device 100 displays an initial generated pointer 541 at a specific point 542 in which the initial generated pointer 541 moves to the right and upward in response to the rotation operation.

Figure 5D:
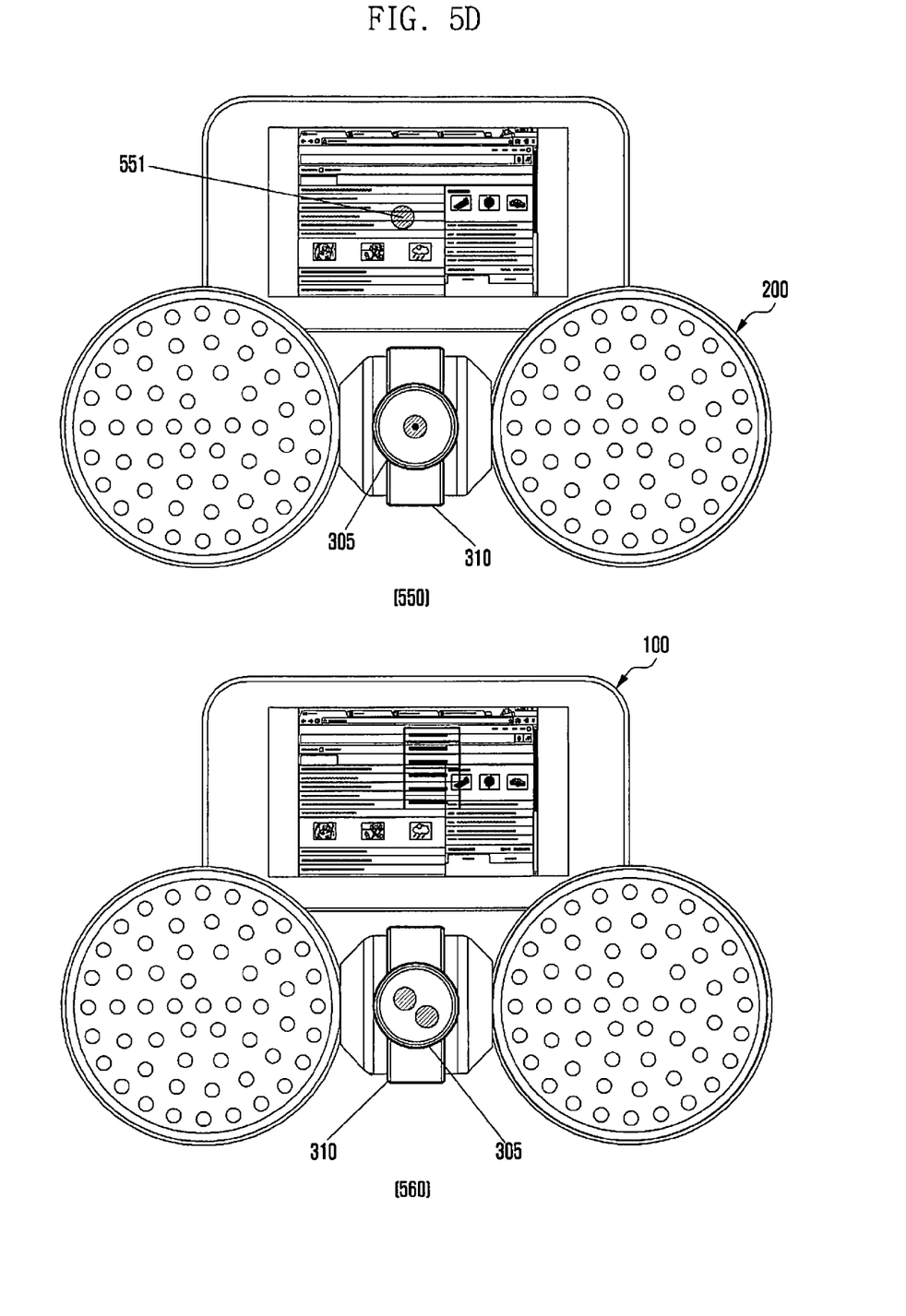

FIG. 5D illustrates a peripheral device that is controlled in a case in which a touch pad function has been selected in a control function selection mode.

Also, when the touch pad function has been executed, in the display device 100, a pointer may be displayed on a screen. Reference numeral 550 of FIG. 5D illustrates one point of a display unit 305 of a wearable electronic device 300 that is touched. Therefore, a pointer previously displayed on the screen selects one point 551 of the screen in response to the touch.

Reference numeral 560 of FIG. 5D illustrates a state in which a multi touch has been performed in a display unit 305 of the wearable electronic device in a state in which a touch pad function has been selected. Then, in the display device 100, a pointer already existing on a screen displays menu in response to the multi touch, as in a state where a mouse has been right-clicked. In the state in which a touch pad function has been selected, the display unit 305 of the wearable electronic device performs the touch pad function so that the display device 100 can be controlled.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:
1. A peripheral device control system comprises:
   a wearable electronic device configured to generate a control command based on a bezel rotation of a display portion; and
   a peripheral device operable to perform at least one function that is controlled in response to the control command generated by the wearable electronic device,
   wherein the peripheral device comprises a docking device that is combined with the wearable electronic device, and
   wherein the docking device is rotatable relative to the wearable electronic device such that rotation of the docking device relative to the wearable electronic device in one of the clockwise and counter-clockwise direction is detected using a variation of a resistance in the docking device, and
   wherein the wearable electronic device includes a benzel rotating part including a pattern formed to recognize rotation of the benzel and a benzel housing for supporting the benzel rotating part, and
   wherein the docking device comprises:
   a loading portion on which a holding part of the wearable electronic device is loaded when the docking device is combined with the wearable electronic device;
   a wireless connection device that performs a wireless connection with the wearable electronic device;

a wireless charging antenna that performs a wireless charging of the wearable electronic device when the wearable electronic device is cradled in the docking device; and a speaker that performs an audio function in response to a control command of the wearable electronic device.

2. The peripheral device control system of claim 1, wherein the peripheral device comprise:

a display device that is combined with the docking device.

3. The peripheral device control system of claim 2, wherein the display device displays a screen in response to control commands of the docking device and the wearable electronic device.

4. The peripheral device control system of claim 1, wherein, when the loading portion has been rotated with reference to a side central axis of the docking device in a combined state of the wearable electronic device, the loading portion of the docking device generates a peripheral device control command based on a direction and a degree of the rotation.

5. The peripheral device control system of claim 1, wherein the wearable electronic device comprises:

a display unit that displays a screen; and a holding part that provides a connection with the docking device.

6. A peripheral device control method comprising:

detecting that a wearable electronic device is mounted in a docking device;

identifying a connection with the docking device by the wearable electronic device;

determining whether a control function selection mode is executed when the connection is identified;

detecting a control function menu selection and controlling a peripheral device with the selected method when the control function selection mode has been executed; and controlling a peripheral device with a previously configured method when the control function selection mode has not been executed, wherein, with the wearable electronic device mounted in the docking device, the docking device is rotatable relative to the wearable electronic device such that rotation of the docking device relative to the wearable electronic device in one of the clockwise and counterclockwise direction is detected using a variation of a resistance in the docking device, and wherein the wearable electronic device includes a bezel rotating part including a pattern formed to recognize rotation of the bezel and a bezel housing for supporting the bezel rotating part, wherein controlling the peripheral device with the previously configured method comprises:

executing a predetermined program by each of functions controlled according to the display unit bezel rotation of the wearable electronic device or the loading portion rotation of the docking device; and operating at least one function mapped to perform at least one of a volume adjustment function, a playback position adjustment function, a screen brightness adjustment function, a playback mode change function, and a playback file change function when the display unit bezel rotation of the wearable electronic device or the loading portion rotation of the docking device has been performed in the program.

7. The peripheral device control method of claim 6, wherein identifying the connection comprises identifying a connection with a display device when the display device is mounted in the docking device.

8. The peripheral device control method of claim 6, wherein identifying the connection comprises:

displaying an interlocking completion screen between devices when the connection has been identified; and executing wireless charging of the wearable electronic device.

9. The peripheral device control method of claim 6, wherein, when a zoom function has been selected in a control function menu, controlling the peripheral device with the selected method comprises controlling the zoom function using one of rotation of a display unit, bezel rotation of the wearable electronic device, and a loading portion rotation of the docking device.

10. The peripheral device control method of claim 6, wherein, when a movement function has been selected in the control function menu, controlling the peripheral device with the selected method comprises:

generating a pointer on a screen; and adjusting a position of the pointer using at least one of rotation of a display unit, bezel rotation of the wearable electronic device, and a loading portion rotation of the docking device.

11. The peripheral device control method of claim 6, wherein, when a touch pad function has been selected in the control function menu, controlling the peripheral device with the selected method comprises:

generating a pointer on a screen;

selecting a point where the pointer is located when a single touch is performed on the display unit of the wearable electronic device; and displaying a menu at a point where the pointer is located when a multi touch is performed the display unit of the wearable electronic device.

* * * * *